(12) United States Patent
Shannon

(10) Patent No.: US 6,169,384 B1
(45) Date of Patent: Jan. 2, 2001

(54) POWER SOURCE SYSTEM FOR PORTABLE ELECTRONIC DEVICES

(75) Inventor: Robert Shannon, Leominster, MA (US)

(73) Assignee: Packard Bell NEC Inc., Woodland Hills, CA (US)

( * ) Notice: Under 35 U.S.C. 154(b), the term of this patent shall be extended for 0 days.

(21) Appl. No.: 09/293,898

(22) Filed: Apr. 19, 1999

(51) Int. Cl.[7] .................................................. H02J 7/00
(52) U.S. Cl. ................................................. 320/107; 307/66
(58) Field of Search ................................... 320/107, 111, 320/134; 307/66

(56) References Cited

U.S. PATENT DOCUMENTS

| | | | |
|---|---|---|---|
| 4,860,185 | * | 8/1989 | Brewer et al. .......................... 363/41 |
| 5,350,645 | * | 9/1994 | Lake et al. ........................... 29/623.3 |
| 5,360,686 | * | 11/1994 | Peled et al. ........................... 429/312 |
| 5,459,671 | * | 10/1995 | Duley ............................ 320/DIG. 21 |
| 5,547,775 | * | 8/1996 | Eguchi et al. ......................... 320/118 |
| 5,599,355 | * | 2/1997 | Nagasubramanian et al. ..... 29/623.5 |
| 5,625,275 | * | 4/1997 | Tanikawa et al. ..................... 320/160 |
| 5,708,351 | * | 1/1998 | Takamoro ............................ 320/135 |
| 5,938,096 | * | 8/1999 | Sauer et al. .......................... 224/625 |
| 5,969,508 | * | 10/1999 | Patino et al. ......................... 320/153 |
| 6,021,332 | * | 2/2000 | Alberth, Jr. et al. ................. 320/111 |

\* cited by examiner

*Primary Examiner*—Peter S. Wong
*Assistant Examiner*—Pia Tibbits
(74) *Attorney, Agent, or Firm*—Mirick, O'Connell, DeMallie & Lougee, LLP

(57) ABSTRACT

An improved power source system, which utilizes power from an external source and is adapted for use with a portable electronic device, comprising, a carrying case, for the portable electronic device, having one or more structural components; a battery charge controller integrated into one or more of the structural components; an AC power supply module integrated into one or more of the structural components, connected to the battery charge controller and adapted to receive power from said power source; one or more rechargeable batteries integrated into one or more of the structural components and connected to the battery charge controller; and a DC Output regulator integrated into one or more of the structural components and connected to the battery charge controller.

21 Claims, 3 Drawing Sheets

POWER SOURCE SYSTEM FOR PORTABLE ELECTRONIC DEVICES

FIELD OF THE INVENTION

This invention relates to power source systems for portable electronic devices and more specifically to power source systems for laptop computers.

BACKGROUND OF THE INVENTION

Current power source systems for portable electronic devices, including laptop computers, typically may include disposable batteries, rechargeable packs and separate AC adapters. For numerous reasons, these power source systems are inadequate. Disposable batteries are wasteful, costly, inconvenient and take up an inordinate amount of space. Separate AC adapters can be misplaced, take up additional space in the carrying case and are merely one more item which the user must keep track of and carry around. Further, rechargeable battery packs are far behind advances being made in portable electronic devices, especially advances in laptop computers. For example, power demands for portable electronic devices have risen faster than contemporaneous increases in battery capacity. In fact, the run times of new portable electronic devices are shorter than the run times of previous models. The typical battery run time for laptop computers is generally about two and a half hours and has remained virtually unchanged for several years.

The batteries currently available for laptop computers also add unwanted weight to the portable computer, take up space within the computer itself and may leak, creating a potentially hazardous situation for the user, and may present environmental problems associated with their disposal. Some types of batteries waste space by packing round batteries into square battery packs in which only 57% of the pack's volume is used by the batteries, including the electronics associated with the batteries. Other types of batteries consist of a plastic brick encasing a large lead acid battery. Although this latter type battery offers about a twenty percent increase in run times over other currently available batteries, these batteries are more than four times heavier and take up an inordinate amount of space and still require a separate AC adapter and output regulator for DC use.

SUMMARY OF THE INVENTION

It is therefore a primary object of this invention to provide a battery system for electronic devices, including laptop computers, which has an extended life.

It is a further object of this invention to provide an extended-life battery system for electronic devices, including laptop computers, which is lightweight.

It is a further object of this invention to provide an extended-life battery system for electronic devices, including laptop computers, which provides space saving benefits.

It is a further object of this invention to provide a rechargeable extended-life battery system for electronic devices, including laptop computers.

It is a further object of this invention to provide a rechargeable battery system for laptop computers which provides increased run times and space saving benefits and is lightweight.

It is a further object of this invention to provide a rechargeable extended-life battery system which provides the increased run times associated with lead acid batteries encased in a plastic brick with the space saving and lightweight advantages of solid polymer batteries.

It is a further object of this invention to provide a battery system for portable electronic devices, including laptop computers, which does not require a separate AC adapter.

It is a further object of this invention to provide a carrying case for a laptop computer in which the AC power supply module is integrated into the structure of the carrying case for the laptop computer.

It is a further object of this invention to provide a carrying case for a laptop computer in which the AC adapter, power source and additional batteries are integrated into the structure of the carrying case for the laptop computer.

It is a further object of this invention to provide a carrying case for portable electronic devices, including laptop computers, in which the carrying case is an additional power source for the electronic device.

It is a further object of this invention to provide a carrying case for portable electronic devices, including laptop computers, which integrates an extended-life battery pack into the carrying case as the internal structural partitions of the case.

It is a further object of this invention to provide an extended-life battery system for portable electronic devices, including laptop computers, which includes an AC adapter function as part of the system.

It is a further object of this invention to provide a battery system for portable electronic devices, including laptop computers, which has three major modes of operation including AC powered mode, battery extender mode and portable battery recharge mode.

It is a further object of this invention to provide a battery system for portable electronic devices, including laptop computers, which includes four sub-systems including an AC power supply, batteries, output regulators and a controller module.

It is a further object of this invention to provide a battery system for laptop computers which provides more energy than can be integrated into the portable device itself.

It is a further object of this invention to provide a battery system for laptop computers which provides 200 Wh of energy.

The system of the invention is the result of efforts to design an extended battery-life system for laptop computers in which the system is an integrated part of the carrying case for the laptop computer. Carrying cases often use sheets of polyethylene, expanded polystyrene or other similar materials to form internal partitions and to give the carrying case its structural shape. In some of the preferred embodiments of the invention, these conventional structural stiffeners are replaced with lithium polymer batteries to fulfill the structural function of these stiffeners while at the same time providing an additional source of battery power with little to no increase in weight. As such, the invention is more versatile and convenient to use by providing users with more battery power per weight carried than if the user had purchased auxiliary battery packs.

A preferred embodiment of the improved power source system of the invention for a portable electronic device which utilizes an external power source, comprises: a carrying case for said electronic device having one or more internal structural components; and an AC power supply module integrated in the structural components of the carrying case and configured to connect the electronic device to the power source.

Another preferred embodiment of the improved power source system of the invention which utilizes power from an external power source and is adapted for use with a portable electronic device, comprises, a carrying case, for the portable electronic device, having one or more structural components; a battery charge controller integrated into one or more of the structural components; an AC power supply module integrated into one or more of the structural components, connected to the battery charge controller and adapted to receive said power from said power source; one or more rechargeable batteries integrated into one or more of the structural components and connected to the battery charge controller; and a DC output regulator integrated into one or more of the structural components and connected to the battery charge controller. The batteries preferably comprise lithium polymer batteries which generally comprise one or more thin, flexible electrolyte-impregnated plastic sheets juxtaposed between metal foil electrodes.

The system may further comprise one or more fuses in series with the batteries and the carrying case may further comprise a means for stiffening one or more of the structural components of the carrying case, wherein the means for stiffening may comprise one or more of said batteries. The battery charge controller may also further comprise a means for directing a portion of the power from the AC power supply module to the batteries while directing another portion of said power to the DC output regulator for powering the electronic device; a means for preventing overcharging and overdischarging of the batteries; and/or a charge indicator which indicates the amount of power stored in the batteries. Likewise, the DC output regulator may further include means for providing overcurrent protection for the battery bag system against defective devices.

For an electronic device provided with internal batteries, the battery charge controller may further comprise a means for directing a portion of the power from said AC power supply module to the batteries while directing another portion of the power to said DC output regulator for powering the electronic device and/or recharging the internal batteries of the electronic device.

Yet another preferred embodiment of the improved power source system of the invention which utilizes power from an external power source and is adapted for use with a portable electronic device, comprises, a carrying case, for the portable electronic device, having one or more structural components; a battery charge controller integrated into one or more of the structural components; an AC power supply module integrated into one or more of the structural components, connected to the battery charge controller and adapted to receive said power from said power source; one or more rechargeable batteries integrated into one or more of the structural components and connected to the battery charge controller; and a DC output regulator integrated into one or more of the structural components and connected to the battery charge controller; wherein the battery charge controller further comprises a means for directing a portion of the power from the AC power supply module to the batteries while directing another portion of the power to the DC output regulator for powering the electronic device. The batteries are preferably lithium polymer batteries and the carrying case may further comprise one or more means for stiffening one or more of the structural components of the carrying case, wherein said means for stiffening may comprise one or more batteries.

Yet another preferred embodiment of the improved power source system of the invention which utilizes power from an external power source and is adapted for use with a laptop computer, comprises, a carrying case, for the laptop computer, having one or more structural components; a battery charge controller integrated into one or more of the structural components; an AC power supply module, integrated into one or more of the structural components, connected to the battery charge controller and adapted to receive said power from said power source, comprising a means for preventing overcharging and overdischarging of the batteries; one or more rechargeable lithium polymer batteries integrated into one or more of the structural components and connected to the battery charge controller; and a DC output regulator, integrated into one or more of the structural components and connected to the battery charge controller, comprising a means for providing overcurrent protection to protect the power source system against defective devices. The battery charge controller may further comprises a gas gauge which indicates the amount of power stored in said batteries and the carrying case may further comprise a means for stiffening one or more of the structural components of the carrying case.

BRIEF DESCRIPTION OF THE DRAWINGS

Other objects, features and advantages will occur to those skilled in the art from the following description of the preferred embodiments and the accompanying drawings in which.

DETAILED DESCRIPTION OF THE PREFERRED EMBODIMENTS

The improved power source system of the invention, which utilizes power from an external source and is adapted for use with a portable electronic device, generally comprises, a carrying case, for the portable electronic device, having one or more structural components; a battery charge controller integrated into one or more of the structural components; an AC power supply module integrated into one or more of the structural components, connected to the battery charge controller and adapted to receive power from the power source; one or more rechargeable batteries integrated into one or more of the structural components and connected to the battery charge controller; and a DC output regulator integrated into one or more of the structural components and connected to the battery charge controller.

Figure 1:
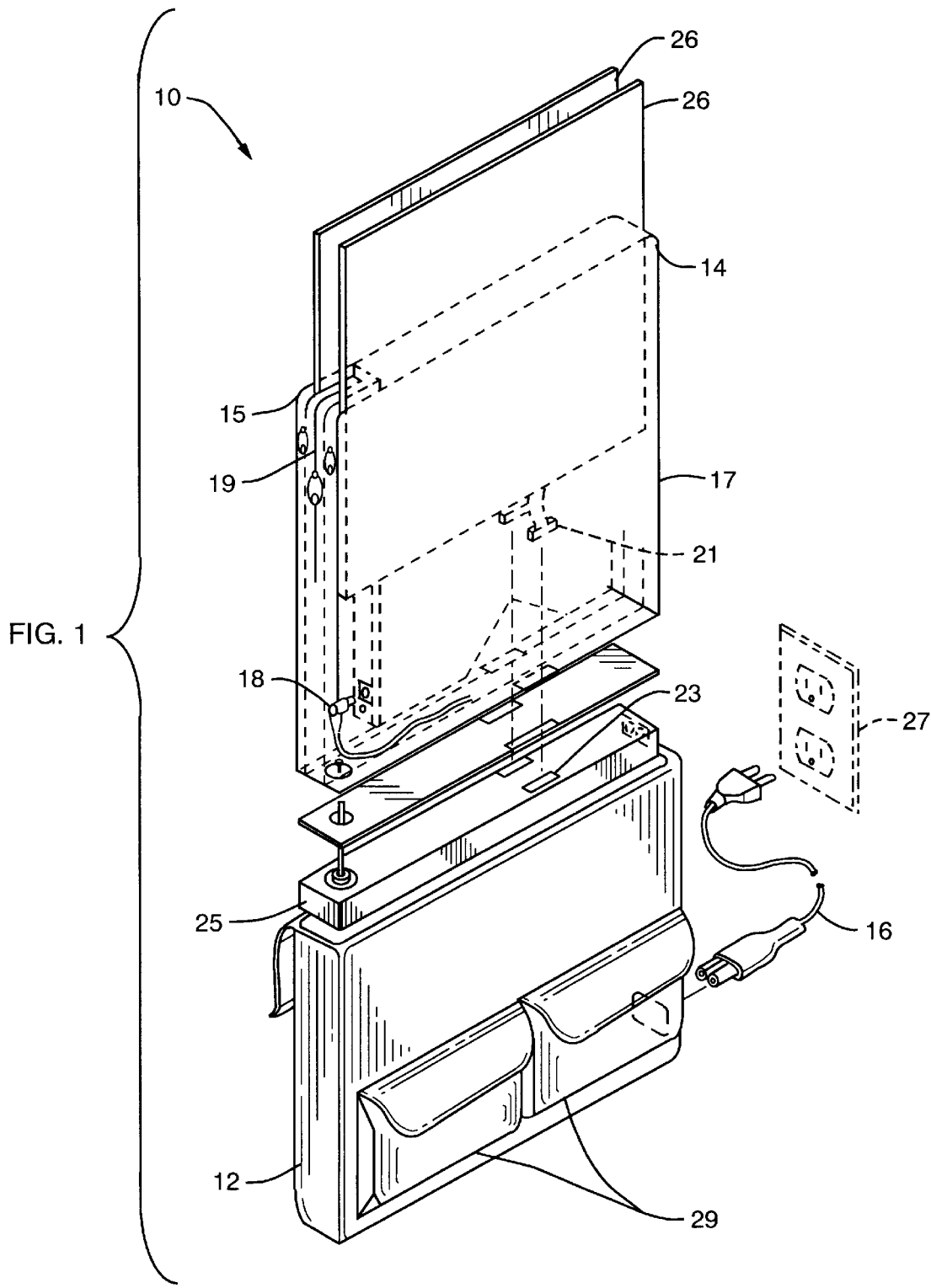
FIG. 1 is a schematic, perspective view of the extended battery-life system of the invention.
Figure 2:
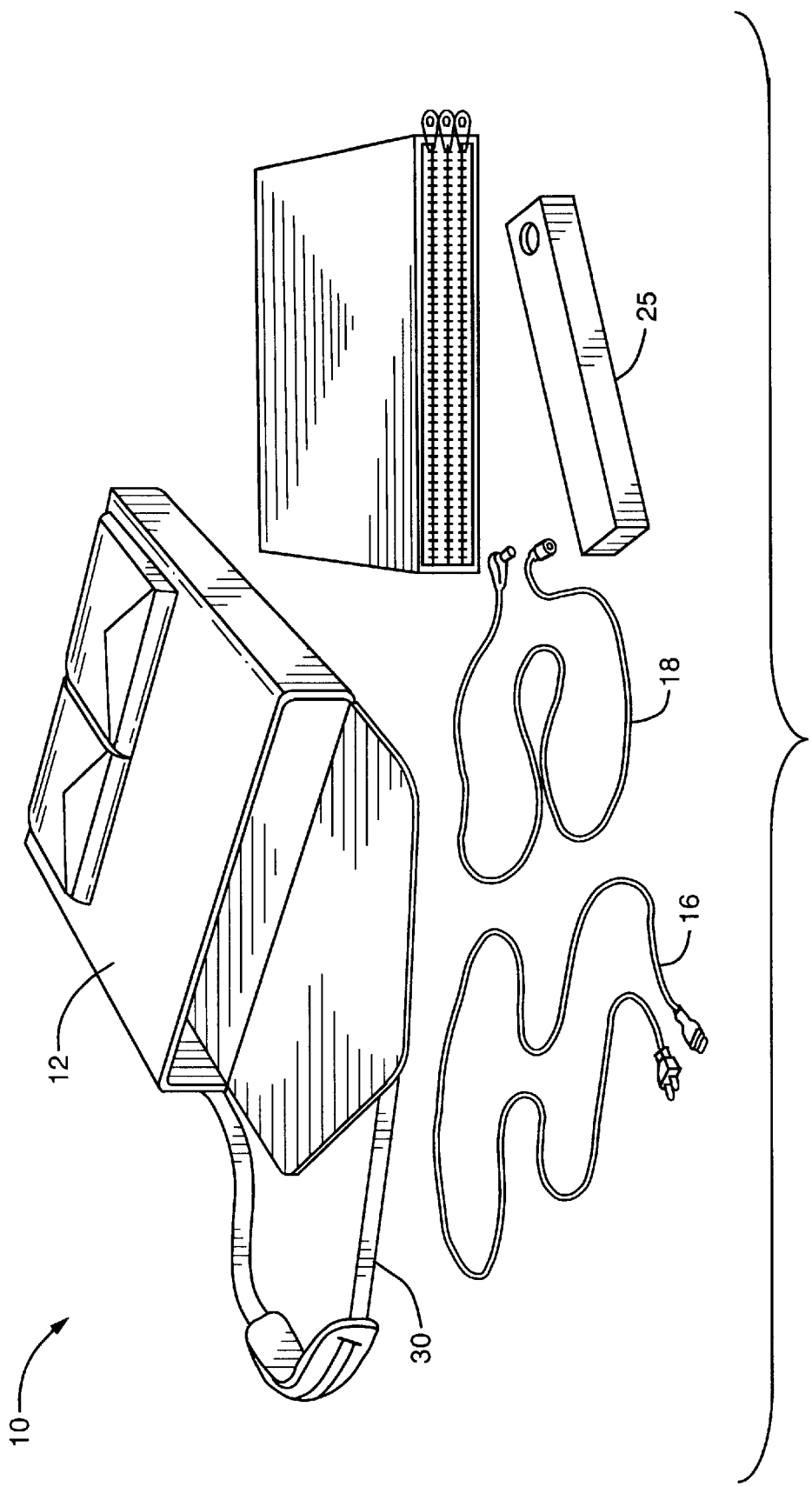
FIG. 2 is the system of FIG. 1, unassembled.
Figure 3:
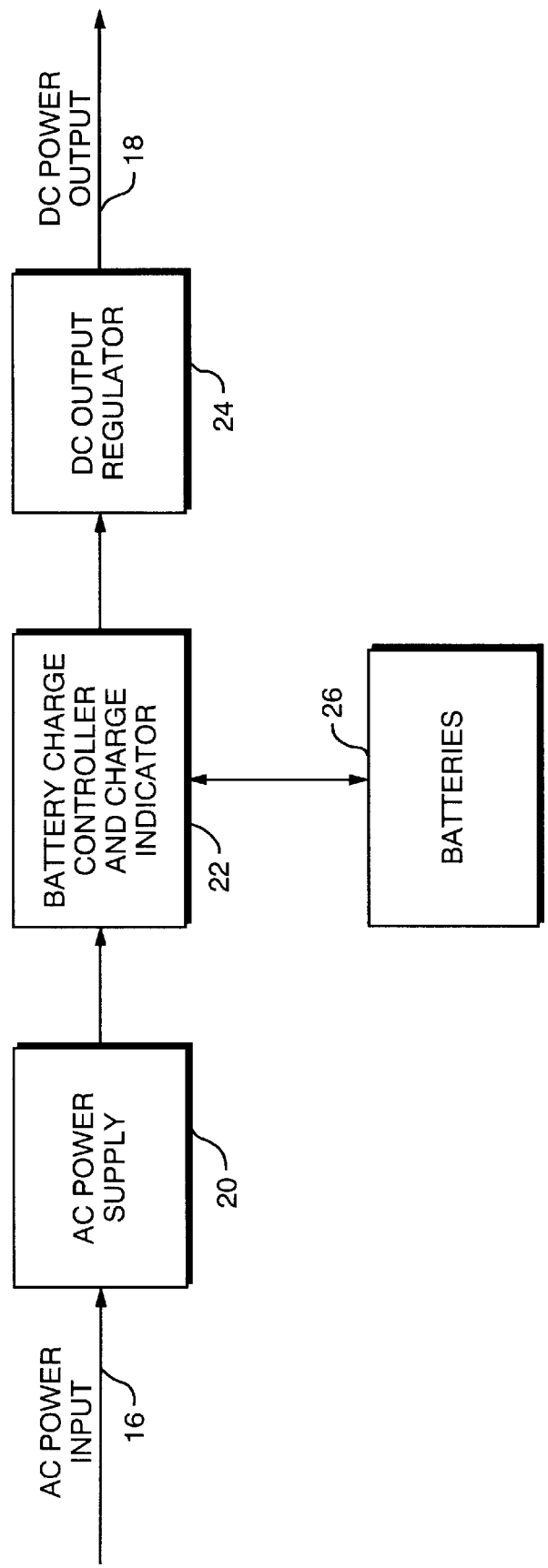
FIG. 3 is a block diagram of the energy flow between the electronic components of the extended battery-life system shown in FIG. 1.

The preferred embodiment of the extended battery-life system of this invention is generally shown and referred to in FIG. 1 as system 10. System 10 is designed to encase and power a typical laptop computer (not shown). System 10 comprises carrying case 12, rechargeable batteries 26, AC power supply cable 16 and DC output cable 18. Batteries 26 are shown only partially inserted into two outer battery compartments 14 and 15 of liner 17 of case 12. AC power supply cable 16 is used to carry power from an electrical outlet 27 to provide power to a laptop computer (not shown) through DC output cable 18 or to provide power to recharge batteries 26. The AC adapter function is preferably configured to power the laptop computer while simultaneously recharging batteries 26 of system 10. Middle compartment 19, located between outer battery compartments 14 and 15, is sized to store the laptop computer therein. Each of batteries 26 are provided with connector 21 at the base of each battery which connects the batteries to contacts 23 in power supply module 25 (FIG. 2) which houses AC power supply 20, battery charge controller 22 and DC output regulator 24 (FIG. 3). The components of power supply module 25, namely, AC power supply 20, battery charge controller 22 and DC output regulator 24, are known to those skilled in the art. Carrying case 12 is also provided with shoulder strap 30 and auxiliary pockets 29 to store incidental items.

FIG. 3 illustrates the flow of energy between, AC power cable 16, DC power cable 18, batteries 26 and the components of power supply module 25, namely, AC power supply 20, battery charge controller 22 and DC output regulator 24.

System 10 of the invention has three major modes of operation, AC powered mode, battery extender mode and computer battery recharge mode. In the AC powered mode, the laptop computer is connected, using DC power cable 18, to power supply module 25 which receives power through AC power cable 16, thus replacing the conventional AC adapter typically provided with a laptop computer. Rather than packing a separate AC adapter in the carrying case, the user can simply plug AC power cable 16 in an electrical outlet and connect DC output cable 18 into the laptop computer. As noted, batteries 26 of system 10 can be simultaneously recharging during AC powered mode.

In the battery extender mode, power is drawn from internal batteries 26 and delivered to the laptop computer through battery charge controller 22 and DC output regulator 24 (FIG. 3). When the energy in batteries 26 is depleted, the laptop computer will switch to its own internal batteries automatically. In the battery extender mode, the added battery capacity of batteries 26 is used to extend the portable run times without the need to replace optional battery packs and without sacrificing functionality by removing drives to accommodate optional batteries. For example, a laptop user could initially power a laptop computer using the internal batteries of the laptop and then when the laptop computer indicates that the battery powered is dwindling, the user can connect DC output cable 18 to the laptop computer and continue operating on power delivered from batteries 26 of system 10.

In battery recharge mode, the laptop computer (not shown) is connected to system 10 to recharge the internal batteries of the laptop.

The operating modes can be combined. For example, it is possible to recharge the internal batteries of the laptop computer while the laptop computer is operated from AC power supply 20 of system 10 or from the stored energy of batteries 26 of system 10. As noted, batteries 26 of system 10 can also be recharged while operating a laptop computer from AC power supply 20. It is also possible to recharge batteries 26 and recharge the internal batteries of the laptop computer while simultaneously operating the laptop computer using AC power supply 20 of system 10. System 10 preferably includes a charge indicator function as a component of battery charge controller 22.

As shown in FIG. 3, system 10 has four major subsystems, AC power supply 20, batteries 26, DC output regulator 24 and battery charge controller 22. AC power supply 20 converts externally provided AC power to low voltage DC for charging batteries 26 and for operating DC output regulator 24. Batteries 26 are preferably lithium polymer batteries made up of thin, flexible sheets. One source for these batteries is Ultralife Batteries, Inc., Newark, N.Y. Using internal chemistry similar to conventional lithium ion battery technology, lithium polymer batteries replace the liquid battery electrolyte with a thin, electrolyte impregnated plastic sheet. Conventional metal battery plates are replaced with metal foil electrodes. The lithium polymer electrolyte is sandwiched between the metal foil electrodes, which together are sealed in a plastic and metal foil packet to form battery 26 (FIG. 1). Each of batteries 26 provides about 100 Wh of energy, therefore, the two batteries 26 of the preferred embodiment can provide about 200 Wh of energy.

An array of batteries can be configured to meet the current and voltage demands of other portable electronic devices. Simple fuses and other protective devices in series with the batteries can be used to ensure that any possible failure of system 10 does not present any danger to the user.

DC output regulator 24 draws power from either AC power supply 20 or from batteries 26 and delivers regulated power to suit the specific requirements of the intended portable electronic device. DC output regulator 24 should also provide an overcurrent protection function to prevent damage caused by short circuits or defective portable devices. DC output regulator 24 is configured to provide the highest possible efficiency for the longest battery life.

Battery charge controller 22 prevents overcharging and overdischarging of batteries 26. Battery charge controller 22 may also provide a status display and charge indicator functionality to inform the user of the status and remaining battery capacity of system 10.

In order to support the three major operating modes of system 10, AC power supply 20 delivers the maximum power drawn by the intended portable electronic device and still has enough remaining capacity to recharge batteries 26 at the same time. DC output regulator 24 should also be configured to deliver the same wattage as the intended portable electronic device's original AC adapter when driven by either AC power supply 20 or by batteries 26.

The elements of system 10, including power supply module 25, batteries 26, AC power supply cable 16 and DC output cable 18, are preferably integrated into the structural components of carrying case 12 of system 10. The term structural components may include, but is not limited to, the outer case, compartment therein and/or an inner liner comprising one or more internal compartments for storing the batteries and the portable electronic device. The elements need not necessarily be encapsulated within the structural components, but should be part of the synergistic whole of carrying case 12. In the case of the batteries, the batteries themselves can be the means for stiffening carrying case 12. As a means for stiffening, the batteries would provide skeletal support to carrying case 12, e.g. to hold the components of the case in their relative position.

The preferred embodiment can be scaled for use with a personal digital assistant, such as 3COM's Palm Pilot, or a laptop computer. It is also envisioned that the extended battery-life system of the invention can be readily adapted for virtually any type of portable electronic device including, but not limited to, cellular telephones and compact disc players.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. An improved power source system for a portable electronic device which utilizes a power source, comprising, a carrying case for said electronic device having one or more internal structural components; and an AC power supply module integrated in said structural components of said carrying case and configured to connect said electronic device to said power source.

2. An improved power source system which utilizes power from a power source and is adapted for use with a portable electronic device, comprising, a carrying case, for said portable electronic device, having one or more structural components;

a battery charge controller integrated into one or more of said structural components;

an AC power supply module integrated into one or more of said structural components, connected to said battery charge controller and adapted to receive said power from said power source;

one or more rechargeable batteries integrated into one or more of said structural components and connected to said battery charge controller; and a DC output regulator integrated into one or more of said structural components and connected to said battery charge controller.

3. The power source system of claim 2, wherein said batteries comprise lithium polymer batteries.

4. The power source system of claim 3, wherein said lithium polymer batteries comprise one or more thin, flexible electrolyte-impregnated plastic sheets juxtaposed between metal foil electrodes.

5. The power source system of claim 2, wherein said battery charge controller further comprises a means for directing a portion of said power from said AC power supply module to said batteries while directing another portion of said power to said DC output regulator for powering said electronic device.

6. The power source system of claim 2, wherein said DC output regulator further includes means for providing overcurrent protection.

7. The power source system of claim 2, wherein said battery charge controller further includes a means for preventing overcharging and overdischarging of said batteries.

8. The power source system of claim 2, wherein said battery charge controller further comprises a charge indicator which indicates the amount of power stored in said batteries.

9. The power source system of claim 2, further comprising one or more fuses in series with said batteries.

10. The power source system of claim 2, wherein said carrying case further comprises one or more means for stiffening one or more of said structural components of said carrying case.

11. The power source system of claim 10, wherein one or more of said means for stiffening comprises one or more battery packaging components adapted to encase said one or more of said batteries.

12. The power source system of claim 2, wherein said electronic device is provided with internal batteries, and said battery charge controller further comprises a means for directing a portion of said power from said AC power supply module to said batteries while directing another portion of said power to said DC output regulator for recharging said internal batteries of said electronic device.

13. An improved power source system which utilizes power from a power source and is adapted for use with a portable electronic device, comprising, a carrying case, for said portable electronic device, having one or more structural components;

a battery charge controller integrated into one or more of said structural components;

an AC power supply module integrated into one or more of said structural components, connected to said battery charge controller and adapted to receive said power from said power source;

one or more rechargeable batteries integrated into one or more of said structural components and connected to said battery charge controller; and a DC output regulator integrated into one or more of said structural components and connected to said battery charge controller;

wherein said battery charge controller further comprises a means for directing a portion of said power from said AC power supply module to said batteries while directing another portion of said power to said DC output regulator for powering said electronic device.

14. The power source system of claim 13, wherein said batteries are lithium polymer batteries.

15. The power source system of claim 13, wherein said carrying case further comprises one or more means for stiffening one or more of said structural components of said carrying case.

16. The power source system of claim 15, wherein one or more of said means for stiffening comprises one or more battery packaging components adapted to encase one or more of said batteries.

17. The power source system of claim 13, wherein said electronic device is provided with internal batteries, and wherein said means for directing a portion of said power from said AC power supply module to said batteries, while directing another portion of said power to said DC output regulator for powering said electronic device, also directs a portion of said power from said AC power supply module to said internal batteries for recharging said internal batteries of said electronic device.

18. An improved power source system which utilizes power from a power source and is adapted for use with a laptop computer, comprising, a carrying case, for said laptop computer, having one or more structural components;

a battery charge controller integrated into one or more of said structural components;

an AC power supply module, integrated into one or more of said structural components, connected to said battery charge controller and adapted to receive said power from said power source, comprising a means for preventing overcharging and overdischarging of said batteries;

one or more rechargeable lithium polymer batteries integrated into one or more of said structural components and connected to said battery charge controller; and a DC output regulator, integrated into one or more of said structural components and connected to said battery charge controller, comprising a means for providing overcurrent protection for said power source system.

19. The power source system of claim 18, wherein said battery charge controller further comprises a charge indicator which indicates the amount of power stored in said batteries.

20. The power source system of claim 18, wherein said carrying case further comprises one or more means for stiffening one or more of said structural components of said carrying case.

21. The power source system of claim 20, wherein one or more of said means for stiffening comprises one or more battery packaging components adapted to encase one or more of said batteries.

* * * * *